(12) United States Patent
Grass et al.

(10) Patent No.: US 9,731,235 B2
(45) Date of Patent: Aug. 15, 2017

(54) FILTER APPLIANCE

(71) Applicant: Mahle International GmbH, Stuttgart (DE)

(72) Inventors: Uwe Grass, Stuttgart (DE); Markus Preissinger, Leonberg (DE)

(73) Assignee: Mahle International GmbH, Stuttgart (DE)

( * ) Notice: Subject to any disclaimer, the term of this patent is extended or adjusted under 35 U.S.C. 154(b) by 182 days.

(21) Appl. No.: 14/767,731

(22) PCT Filed: Feb. 12, 2014

(86) PCT No.: PCT/EP2014/052737
§ 371 (c)(1),
(2) Date: Aug. 13, 2015

(87) PCT Pub. No.: WO2014/124974
PCT Pub. Date: Aug. 21, 2014

(65) Prior Publication Data
US 2015/0367265 A1     Dec. 24, 2015

(30) Foreign Application Priority Data
Feb. 14, 2013 (DE) .......................... 10 2013 202 449

(51) Int. Cl.
*B01D 35/30* (2006.01)
*B01D 35/153* (2006.01)
(Continued)

(52) U.S. Cl.
CPC ............. *B01D 35/30* (2013.01); *B01D 29/13* (2013.01); *B01D 29/21* (2013.01); *B01D 35/153* (2013.01);
(Continued)

(58) Field of Classification Search
None
See application file for complete search history.

(56) References Cited

U.S. PATENT DOCUMENTS 6,926,826 B2 *  8/2005  Reid .................... B01D 35/301
                                                  210/232
7,695,618 B2 *  4/2010  Mules .................... B01D 27/08
                                                  210/232
(Continued)

FOREIGN PATENT DOCUMENTS

CN     102648036 A     8/2012
DE   102009030503 A1   12/2010
(Continued)

OTHER PUBLICATIONS

Chinese Office Action 201480006649.2, dated Apr. 6, 2016.

*Primary Examiner* — Thomas M Lithgow
(74) *Attorney, Agent, or Firm* — Fishman Stewart PLLC

(57) ABSTRACT

A filter appliance may include a filter housing and a ring filter element having an axis and being mountable in the filter housing. The filter element may include a first axial end disc having a protruding pin configured to engage into a channel of the filter housing. The filter housing may have an interior including a first region and the ring filter element may include a second region associated with the first region. A guide contour may be arranged on one of the first region and the second region, and a first guide element and a second guide element may be disposed on the other of the first region and the second region. The guide contour may include a first axial groove and a second axial groove configured to receive the first guide element and the second guide element to define a key and lock interaction.

20 Claims, 5 Drawing Sheets

(51) Int. Cl.
  *B01D 35/16* (2006.01)
  *B01D 29/21* (2006.01)
  *B01D 29/13* (2006.01)

(52) U.S. Cl.
  CPC ...... *B01D 35/16* (2013.01); *B01D 2201/0415* (2013.01); *B01D 2201/29* (2013.01); *B01D 2201/291* (2013.01); *B01D 2201/4007* (2013.01); *B01D 2201/4053* (2013.01)

(56) References Cited

U.S. PATENT DOCUMENTS

| | | |
|---|---|---|
| 8,920,650 B2 | 12/2014 | Stifel et al. |
| 9,023,203 B2 | 5/2015 | Ardes |
| 2009/0008317 A1* | 1/2009 | Mules .................. B01D 27/08 210/233 |
| 2012/0261326 A1* | 10/2012 | Deschamps ............ B01D 29/96 210/236 |
| 2013/0228503 A1 | 9/2013 | Baumann et al. |

FOREIGN PATENT DOCUMENTS

| | | |
|---|---|---|
| DE | 102009049868 A1 | 4/2011 |
| DE | 102009054523 A1 | 6/2011 |
| DE | 102010043834 A1 | 5/2012 |
| WO | WO-2006120326 A1 | 11/2006 |

\* cited by examiner

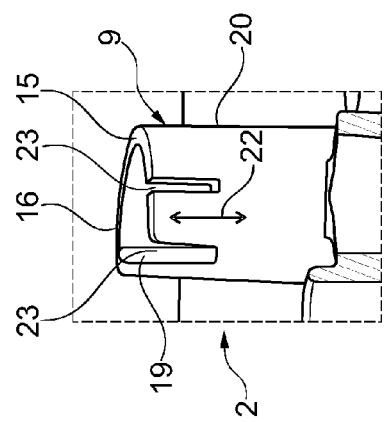
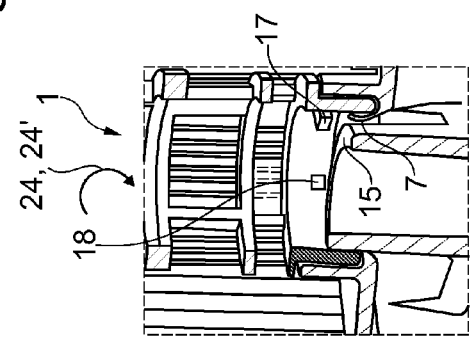
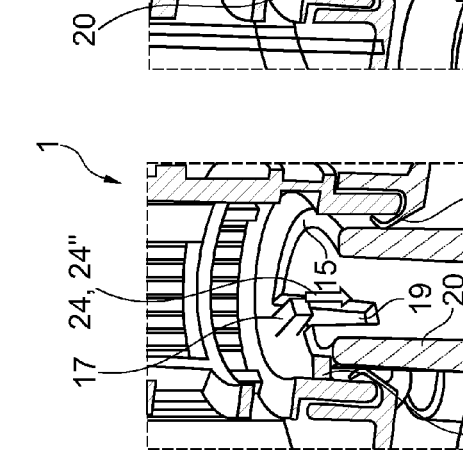
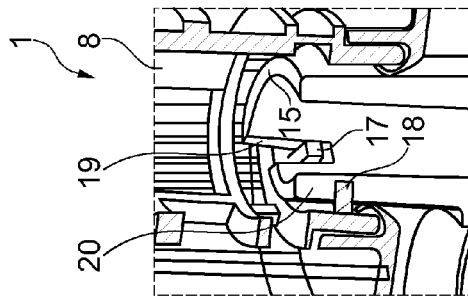
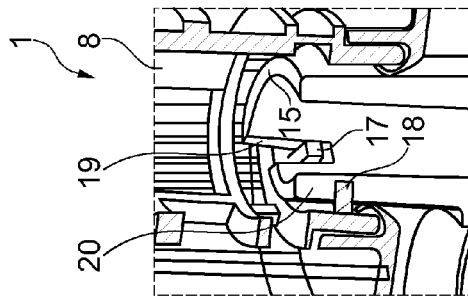

FILTER APPLIANCE

CROSS-REFERENCE TO RELATED APPLICATIONS

This application claims priority to German Patent Application No. 10 2013 202 449.5, filed Feb. 14, 2013, and International Patent Application No. PCT/EP2014/052737, filed Feb. 12, 2014, both of which are hereby incorporated by reference in their entirety.

TECHNICAL FIELD

The present invention relates to a filter appliance having a filter housing and a ring filter element that is mountable therein.

BACKGROUND

A filter appliance serves for the cleaning or respectively filtering of a fluid, such as for example of air or oil. For this, the filter appliance generally has a filter element which can be constructed in particular as a ring filter element and is mountable into an associated filter housing. The ring filter element can hereby therefore be replaced if required. Such a ring filter element has, on a lower end disc, an axially protruding pin, which in the assembled state of the ring filter element in the filter housing engages into an associated channel of the filter housing. Said channel can be configured for example as a discharge channel, so that on dismantling of the ring filter element from the filter housing, fluid situated in the filter housing, i.e. in particular oil, can flow out through the channel. Such filter appliances come into use in various applications. This includes, for example, the use in motor vehicles, in which such a filter appliance cleans fluids required for the operation of the motor vehicle. In this case, it is desirable to achieve a sufficient cleaning of the fluid which is to be cleaned. In particular, the quality of the ring filter element plays a decisive role here. It is therefore desirable to only use such ring filter elements which have a corresponding quality and, in particular, are authorized. There exists, in addition, the desire to configure the mounting or respectively the dismantling of the ring filter element into or respectively out from the filter housing in a simple and economically favourable manner.

In order to meet these specifications, it is known from DE 10 2009 049 868 A1 and DE 10 2009 054 523 A1 to provide or respectively configure the ring filter element and the filter housing with associated regions, wherein one of the regions has an axial groove, whilst the other associated region has a guide element, such that the guide element, on the mounting of the ring filter element, is guided along a guide contour adjoining the axial groove, and in the assembled state engages into the axial groove. Only in this state does the pin, arranged on the end disc of the ring filter element, also engage into the associated channel and enable a fault-free function of the filter appliance.

It is disadvantageous here in particular that the mounting or respectively dismantling of the ring filter element into or respectively out from the filter housing is manoeuvred with difficulty. In addition, a corresponding application of force onto the filter appliance, in particular onto the ring filter element can lead to a damage of the guide contour and/or of the guide element, which sometimes can lead to a relative movement of the ring filter element with respect to the filter housing and therefore impairs the fault-free mode of operation of the filter appliance.

SUMMARY

The present invention is concerned with the problem of indicating for a filter appliance of the generic type an improved or at least alternative embodiment, which is distinguished in particular by a simplified mounting or respectively dismantling of the ring filter element and/or by a stable arrangement of the ring filter element in the filter housing in the assembled state and is able to be implemented as economically as possible.

This problem is solved according to the invention by the subject of the independent claim(s). Advantageous embodiments are the subject of the dependent claims.

The present invention is based on the general idea of providing the guide contour with not only a single axial groove, but rather additionally with at least one further axial groove and of providing at least one further guide element, and to arrange or respectively construct these such that in the assembled state respectively an axial groove interacts with an associated guide element. Hereby, a simplified mounting or respectively dismantling of the ring filter element into the housing is achieved, because the mounting or respectively dismantling of the ring filter element is supported by at least two such guide elements and the guide contour. In particular, the guide elements can be arranged such that a tilting of the ring filter element with respect to the filter housing is prevented or at least reduced. In the assembled state, moreover, an increased stability of the filter appliance is produced, such that the filter appliance, in particular the ring filter element, withstands higher forces. The guide contour with the axial grooves and the associated guide elements therefore function according to the lock and key principle, whereby also the security of the filter appliance is increased in that exclusively fitting or respectively authorized ring filter elements come into use and therefore in particular the reliability and a fault-free functioning of the filter appliance can be guaranteed for the customer. According to the idea of the invention, the filter appliance therefore has the filter housing and the ring filter element mountable therein. For the mounting or respectively dismantling of the ring filter element into or respectively out from the filter housing, the filter housing can have, for example, a removable housing cover, with which the ring filter element interacts on mounting or respectively dismantling. The ring filter element has a lower end disc, on which an axially protruding pin is arranged, which in the assembled state of the ring filter element engages into an associated channel of the filter housing. In the assembled state of the ring filter element, therefore, on the one hand the respective guide element engages into such an associated axial groove and the pin engages into the channel. Preferably, the axial grooves have the same orientation as the pin. A fault-free functioning of the filter appliance is possible here only in this state. The guide contour with the axial grooves and the guide elements are arranged and in particular constructed at associated regions of the ring filter element and of the filter housing. In other words: the filter housing has in its interior a first region, whilst the ring filter element has a second region associated with this first region. Here, the guide contour is arranged on one of these regions, whilst the guide elements are arranged on the other, associated region. This means that the guide contour is arranged on the first region of the filter housing, whilst the guide elements are arranged on the second region of the ring filter element, or vice versa. Here, on mounting of the ring filter element, the guide elements are able to be guided along the guide contour. In particular, on mounting, the guide elements can be guided on the guide contour, wherein at least one of the guide elements can slide along the guide contour. According to the invention, the guide elements and the axial grooves interact according to the lock and key principle, in order to enable a mounting or respectively dismantling of the ring filter element in or respectively out from the filter housing.

The lock and key principle exists in particular in that the respective guide element can only engage into a single axial groove. For this, the respective guide element and/or the respective axial groove can be constructed and/or arranged such that the respective guide element can engage into a non-associated axial groove neither on mounting or respectively dismantling nor in the assembled state.

The lock and key principle can also be realized in particular in that the axial grooves have respectively a different shape and/or size. Accordingly also, the associated guide elements, which are constructed in a complementary manner, respectively have a different shape and/or size.

The mounting of the ring filter element in to the filter housing takes place in preferred embodiments in that the ring filter element is turned into the filter housing by means of a mounting movement realized by the guiding of at least one such guide element on the guide contour. This applies accordingly for a dismantling of the ring filter element. The mounting movement can be, in particular, a screwing movement clockwise or anticlockwise, wherein the dismantling can take place accordingly by a dismantling movement in the opposite direction. It is conceivable here that the ring filter element, with a predetermined relative position with respect to the filter housing, is mountable into the filter housing directly and without a corresponding guidance of the guide elements on the guide contour. The relative position is, in particular, the position in which the respective guide element is arranged aligned to the associated axial groove and the pin is arranged aligned to the channel. This applies accordingly for the dismantling of the ring filter element from the filter housing.

Embodiments are preferred, in which an inlet cross-section of the axial grooves, through which the associated guide element arrives into the axial groove, increases along the mounting movement. Thereby, it is prevented in particular that the respective guide element engages into a non-associated axial groove and prevents a further rotation. For this, in particular, provision can be made that the size of the guide elements varies accordingly along the mounting movement.

The guide contour can basically have any desired shape and/or size. In preferred embodiments, the guide contour is constructed or respectively shaped in the manner of a ramp. The ramp-like construction of the guide contour can be realized in particular by a spiral-shaped construction of the guide contour around a rotation axis provided by the mounting. Through such a construction of the guide contour, during the mounting a lowering of the ring filter element into the filter housing or respectively a withdrawing of the ring filter element out from the filter housing takes place.

Alternatively, the guide contour can be constructed in the manner of a cannula and can have two oppositely directed ramps. In this variant, also, a simplified mounting or respectively dismantling of the ring filter element in or respectively out from the filter housing is produced.

The assembled state of the ring filter element in the filter housing, in which the pin engages into the channel, is in particular the position in which the ring filter element takes up its deepest position in the filter housing. Accordingly, embodiments are preferred, in which the deepest arranged axial groove is arranged lowest along a height of the guide contour. In particular, therefore, the axial groove with the greatest inlet cross-section is arranged lower along the height of the guide contour than the other axial grooves with respectively larger inlet cross-sections. This applies in particular in the case of guide contours constructed in a ramp-like or respectively cannula-like manner. Embodiments are particularly preferred here, in which the axial groove with the greatest inlet cross-section is arranged at the lowest point of the guide contour. Therefore, the guide element associated with the axial groove having the greatest inlet cross-section can be guided, during mounting, along the guide contour, and on reaching the lowest point of the guide contour can engage into the associated axial groove. Here, also, the other guide elements engage into the associated axial grooves and the pin into the channel.

Generally, the guide contour can be arranged at any desired region of the ring filter element or respectively of the filter housing. This applies accordingly for the associated guide elements. In particular, the guide contour can be arranged on a dome of the filter housing engaging into the interior of the ring filter element. It is conceivable here to arrange the guide contour onto an outer contour or on a face side of the dome. In this case, the guide elements are arranged on an inner circumference, facing the dome, in particular on an inner frame, of the ring filter element. The inner frame of the filter element is generally arranged here in the manner of cylinder centrally in the ring filter element and serves in particular for the mounting and/or stabilizing of the ring filter element. In the said embodiment, therefore, the dome of the filter housing corresponds to the first region, whilst the inner circumference or respectively the inner frame of the ring filter element corresponds to the second region.

In other embodiments, the guide contour is arranged on an outer circumference of the ring filter element, facing the filter housing, whilst the guide elements are arranged on an inner circumference of the filter housing facing the outer circumference of the ring filter element.

In a further alternative, the guide contour is arranged on an inner circumference of the filter housing, facing the ring filter element, whilst the guide elements are arranged on an outer circumference of the ring filter element facing the inner circumference of the filter housing.

It shall be understood that the guide contour and/or the respective guide element can be constructed on the associated region. This therefore means that the guide contour and/or the respective guide element can be part of the associated region of the filter housing or respectively of the ring filter element or respectively part of the filter housing or of the ring filter element.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
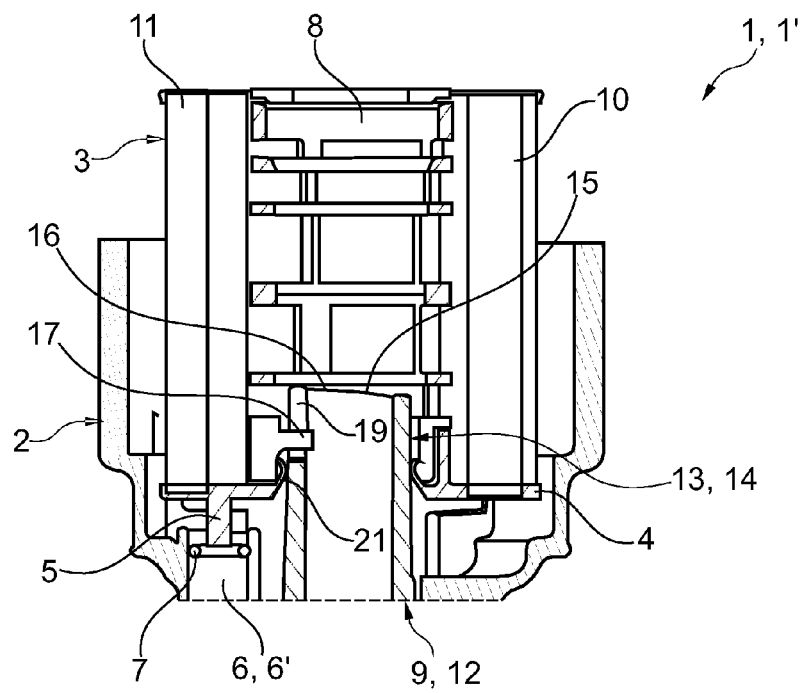
FIG. 1 a longitudinal section through a filter appliance according to the invention, FIG. 2 a three-dimensional view of a ring filter element, FIG. 3 a section through a filter appliance in the region of a pin, FIG. 4 a three-dimensional view of a dome of the filter appliance, FIG. 5a-5d different sections through a filter appliance at respectively different mounting states of the ring filter element, FIG. 6 a three-dimensional view of a dome of different embodiment, FIG. 7 a three-dimensional view of a filter appliance in the region of a lower end disc, FIG. 8 a three-dimensional view of the end disc of FIG. 7, FIG. 9 a three-dimensional view of a ring filter element, FIG. 10 a three-dimensional top view onto a filter housing, FIG. 11 a longitudinal section through a filter housing, FIG. 12 a three-dimensional view of a ring filter element.

FIG. 1 shows a longitudinal section through a filter appliance 1, which can be configured, for example, as an oil filter 1'. The filter appliance 1 has a filter housing 2 and a ring filter element 3 that is mountable into the filter housing 2 wherein in FIG. 1 a state of the ring filter element 3 mounted into the filter housing 2 is illustrated. The filter housing 2 has, in addition, a housing cover, not illustrated here, which with respect to the illustration shown in FIG. 1 closes off the filter housing 2 at the top and is removable from the remaining filter housing 2, for example by a corresponding thread, in order to enable a mounting and a dismantling of the ring filter element 3 in or respectively out from the filter housing 2. The ring filter element 3 has on its side facing away from the housing cover a lower end disc 4, on which is arranged a pin 5, arranged eccentrically and protruding axially from the lower end disc 4. In the assembled state, the pin 5 engages into a channel 6 of the filter housing 2, which in particular can be constructed as a discharge channel 6', which serves for example for the discharging of residual oil from the filter housing 2 on the dismantling of the ring filter element 3. The pin 5 is surrounded by a sealing ring 7, in order to seal the channel 6.

The ring filter element 3 is constructed in a cylindrical shape and has a centrally arranged, and likewise cylindrically constructed inner frame 8, which serves for the stabilizing of the ring filter element 3 and the mounting of the ring filter element 3 into the filter housing 2. In the assembled state, a dome 9 of the filter housing 2 engages into the interior of the inner frame 8 and therefore of the ring filter element 3. The inner frame 8 is surrounded by a filter material 10, which is delimited on axially opposite sides by the lower end disc 4 and an upper end disc 11 of the ring filter element 3.

In addition, the filter housing 2 has a first region 12, whilst the ring filter element 3 has a second region 13 associated with the first region 12 of the filter housing 2. In the example shown in FIG. 1, the first region 12 corresponds to the dome 9, whilst the second region 13 corresponds to an inner circumference 14 of the ring filter element 3, which is formed by the inner frame 8. On the first region 12 and therefore on the dome 9, a guide contour 15 is arranged, which is constructed on the face side 16 of the dome 9 facing the ring filter element 3. In addition, on the second region 13 and accordingly on the inner circumference 14 of the inner frame 8 at least two guide elements 17, 18 are arranged, wherein in the illustration shown in FIG. 1 only one such guide element 17 is visible. In the assembled state of the ring filter element 3 shown in FIG. 1, the respective guide element 17, 18 engages into an associated axial groove 19, 20 of the guide contour 15. This means that in the assembled state of the ring filter element 3 on the one hand the pin 5 engages into the channel 6 and on the other hand the guide elements 17, 18 into the associated axial grooves 19, 20.

Figure 2:
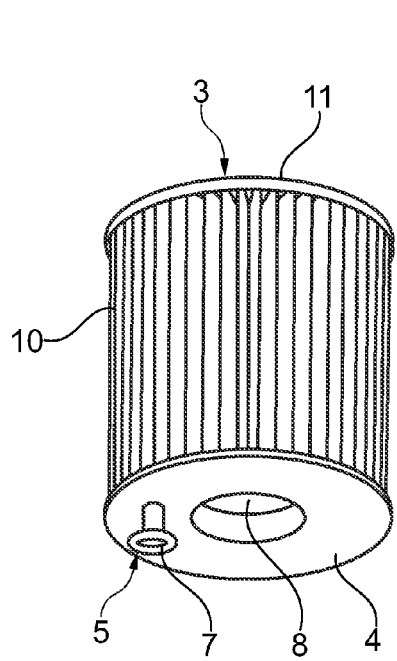
Figure 3:
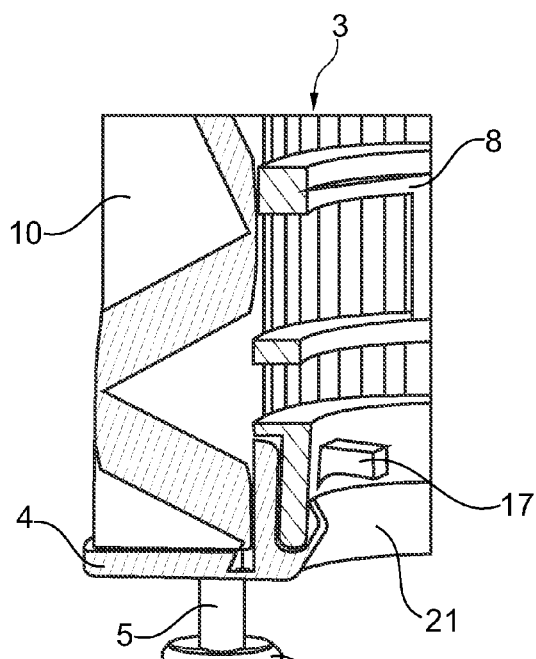

FIG. 2 shows a three-dimensional view of the ring filter element 3, whilst FIG. 3 shows a section through the ring filter element 3. In particular in FIG. 3 it can be seen here that the inner frame 8 is encompassed on the side facing the pin 6 by a sealing lip 21 arranged on the lower end disc 4, which sealing lip guarantees a sealing of the ring filter element 3.

FIG. 4 shows a three-dimensional view of the dome 9. It can be seen therein that the guide contour 15 constructed on the face side 16 of the dome 9 has at least two axial grooves 19, 20, with the embodiments shown in FIGS. 1 to 12 having only two such axial grooves 19, 20. In addition, it can be seen that the guide contour 15 is constructed in the manner of a ramp or respectively has a spiral-shaped construction. Here, one of the axial grooves 19 is arranged at the lowest point along a height 22 of the guide contour 15 which is constructed in a ramp-like manner. Accordingly, the other axial groove 20 is constructed at a higher point with respect to the height 22 of the guide contour 15. In FIG. 4 it can be seen in addition that the axial groove 19 arranged at the lowest point of the guide contour 15 is constructed larger, in particular has a greater entry cross-section 23, than the other axial groove 20.

FIGS. 5a to 5d show respectively a section through the filter appliance 1 at different states during the mounting of the ring filter element 3 into the filter housing 2 with the dome 9 illustrated in FIG. 4. In FIG. 5, it can be seen that the guide element 17 associated with the axial groove 19 arranged at the lowest point of the guide contour 15 is constructed larger than the guide element 18 associated with the other axial groove 20. The guide elements 17, 18 are arranged here at the same height on the inner circumference 14 of the inner frame 8 or respectively of the ring filter element 13. During the mounting of the ring filter element 3 into the filter housing 2, the guide elements 17, 18 are guided along the guide contour 15, wherein the guide element 18, associated with the axial groove 20, slides along the guide contour 15. Accordingly, the mounting of the ring filter element 3 into the filter housing 2 takes place by a mounting movement 24, indicated by arrows, which here corresponds substantially to a screwing movement 24'. Through the mounting movement 24, the guide elements 17, 18 are therefore guided along the guide contour 15. Here, the larger guide element 17 is guided over the axial groove 20 with the smaller inlet cross-section 23, without engaging therein, because the guide element 17 has greater dimensions than the inlet cross-section 23 of this axial groove 20. When the larger guide element 17 is arranged above the associated axial groove 19 (FIG. 5c), it strikes against the dome 9 owing to the ramp-like construction of the guide contour 15, so that a further screw-like mounting movement 24 is not possible. In this position, the other guide element 18 is also situated above the associated axial groove 20, whilst the pin 5 is arranged above the channel 6. Accordingly, the ring filter element 3 can be displaced with an axial movement 24″ such that the guide elements 17, 18 respectively engage into the associated axial groove 19, 20. In this position, the pin 5 also engages into the channel 6. Accordingly, a fault-free functioning of the filter appliance 1 is possible only in the state shown in FIG. 5*d* and FIG. 1.

The mounting movement 24 can take place in particular through said housing cover, which can have a corresponding connection with the ring filter element 3 and during the mounting of the ring filter element 3 into the filter housing 2 is screwed with the filter housing 2.

In FIGS. 5*a* to 5*d*, it can therefore be readily seen that the guide elements 17, 18 and the axial grooves 19, 20 function according to the lock and key principle on the mounting of the ring filter element 3 into the filter housing 2. Thereby, it can be prevented that undesired ring filter elements 3, which for example have an insufficient quality, can be mounted into the filter housing 2.

Figure 6:
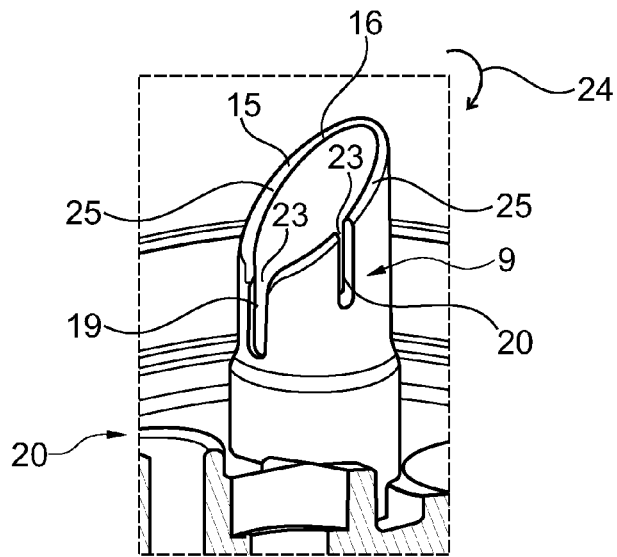

FIG. 6 shows a three-dimensional view of such a dome 9 in another embodiment. The dome 9 has a cannula-like shape and is constructed on the face side 16 of the dome 9. The guide contour 15, constructed in a cannula-like manner, has here two oppositely directed ramps 25, which run symmetrically. In this embodiment also the axial groove 19 with the greater entry cross-section 23 is arranged at the deepest point of the guide contour 15, whilst the axial groove 20 with the smaller inlet cross-section 23 is arranged higher and is constructed in the region of one of the ramps 25. Hereby, the mounting movement 24 takes place such that the guide element 17 associated with the axial groove 19 is guided, during mounting, over the axial groove 20 with the smaller inlet cross-section 23. In an analogous manner to the course of the mounting shown in FIGS. 5*c* and 5*d*, the guide elements 17, 18 then engage into the associated axial grooves 19, 20.

Figure 7:
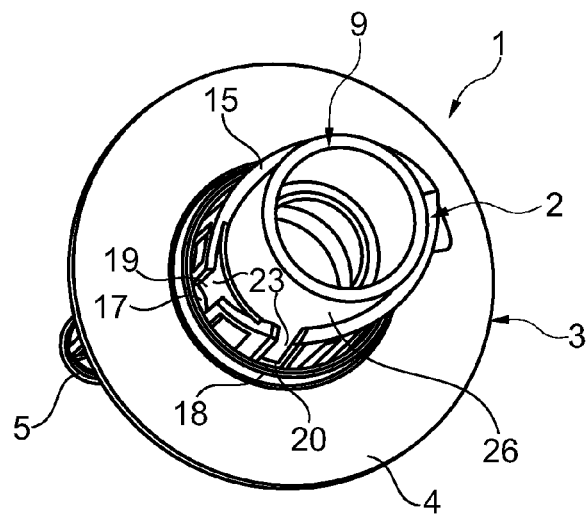
Figure 8:
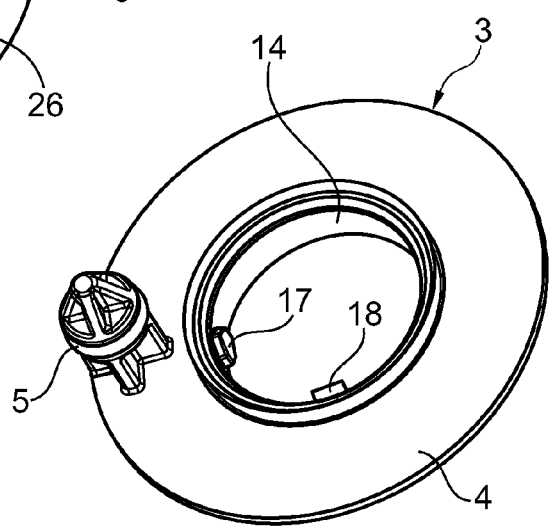

In FIG. 7 a different embodiment of the filter appliance 1 is shown, wherein for the sake of ease of understanding, only the lower end disc 4 of the ring filter element 3 and the dome 9 of the filter housing 2 are illustrated. In the embodiment shown in FIG. 7, the guide contour 15 is arranged on an outer circumference 26 of the dome 9 and is constructed in a cannula-shaped manner. In FIG. 8 the associated lower end disc 4 is illustrated separately. It can be seen therein that the guide elements 17, 18 are arranged on the end disc 4 and are constructed in the manner of a screw head.

Figure 9:
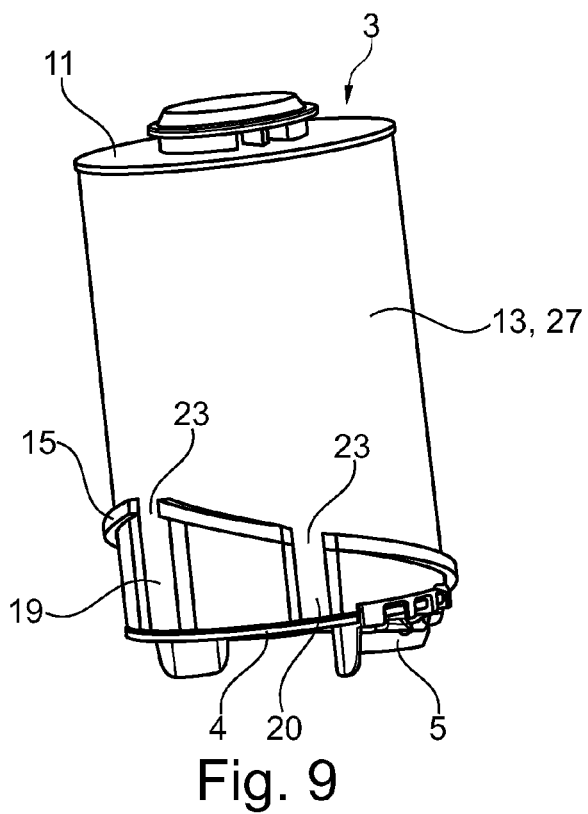
Figure 10:
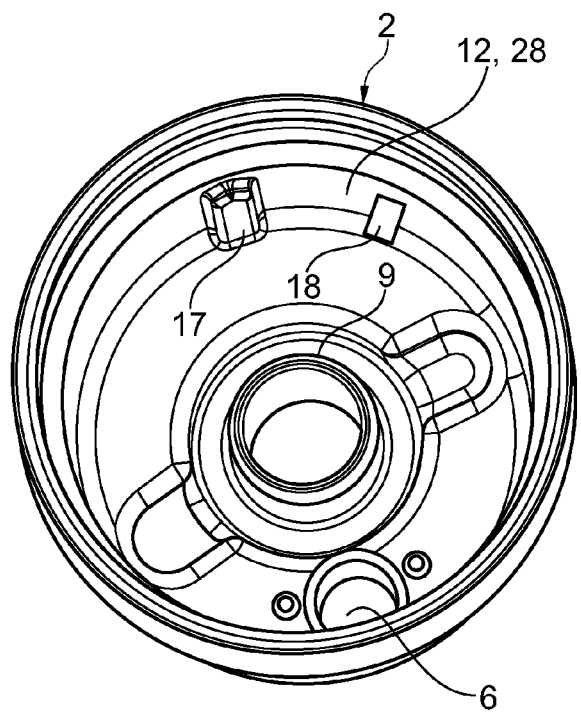

A further embodiment of the filter appliance 1 is illustrated in FIGS. 9 and 10, wherein FIG. 9 shows the ring filter element 3, whilst in FIG. 10 the associated filter housing 2 is illustrated. Here, the guide contour 15 is arranged on an outer circumference 27 of the ring filter element 3, which therefore corresponds to the second region 13. In the assembled state, the outer circumference 27 of the ring filter element 3 faces an inner circumference 28 of the filter housing 2. The guide elements 17, 18 associated with the axial grooves 19, 20 are arranged on the inner circumference 28 of the filter housing 2, whereby the inner circumference 28 of the filter housing 2 corresponds to the first region 12. Here, in contrast to the previous embodiments, the axial groove 19 with the greatest inlet cross-section 23 is not arranged at the lowest point of the guide contour 15, but rather at the highest point of the guide contour 15.

Figure 11:
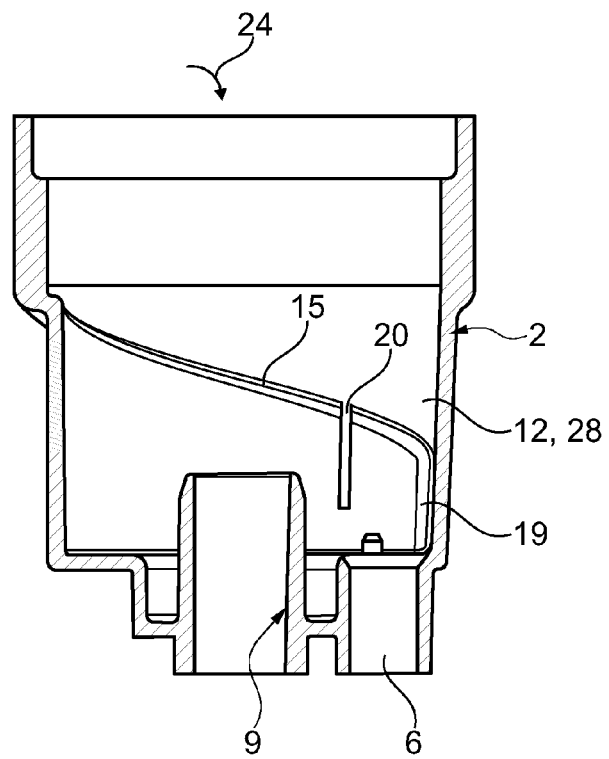
Figure 12:
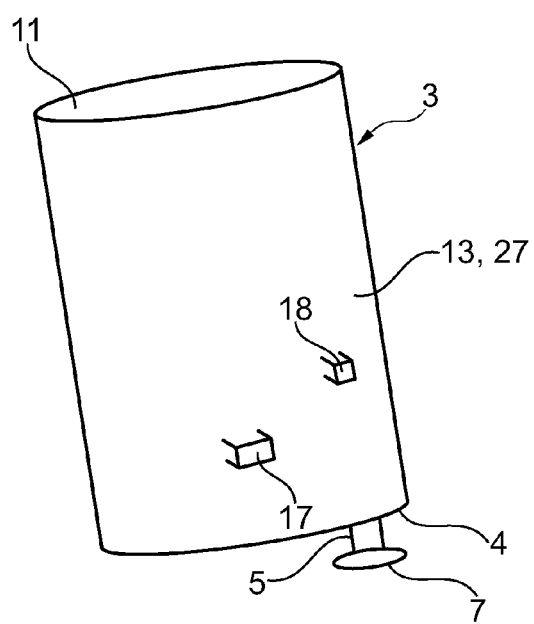

FIGS. 11 and 12 show a further embodiment of the filter appliance 1, wherein in FIG. 11 a longitudinal section through the filter housing 2 is shown, whilst in FIG. 12 a three-dimensional view of the associated ring filter element 3 is illustrated. In contrast to the embodiment illustrated in FIGS. 9 and 10, the guide contour 15 is arranged here on the inner circumference 28 of the filter housing 2, whilst the guide elements 17, 18 are arranged on the outer circumference 27 of the ring filter element. In addition, the guide elements 17, 18, in contrast to the previous embodiments, are arranged at different heights of the associated region 13, here, therefore, different heights of the outer circumference 27 of the ring filter element 3.

In the embodiments illustrated in FIGS. 7 and 8 or respectively 9 and 10, the guide contour 15 is constructed in a framework-like manner and is arranged on the corresponding outer circumference 26, 27.

The invention claimed is:

1. A filter appliance comprising: a filter housing and a ring filter element having an axis and being mountable in the filter housing,
    the ring filter element including a first axial end disc, having an axially protruding pin configured to engage into a channel of the filter housing when the ring filter element is mounted in the filter housing,
    the filter housing defining an interior having a first region,
    the ring filter element having a second region associated with the first region,
    a guide contour arranged on one of the first region and the second region,
    a first guide element disposed on the other of the first region and the second region, wherein the first guide element is configured to be guided on the guide contour during the mounting of the ring filter element in the filter housing,
    the guide contour including a first axial groove,
    wherein the axially protruding pin engages into the channel and the first guide element engages into the first axial groove of the guide contour when the ring filter element is mounted in the filter housing,
    the guide contour further including at least one second axial groove, and
    a second guide element disposed on the one of the first region and the second region including the first guide element, the second guide element associated with a second axial groove disposed on the guide contour,
    wherein the first axial grooves and the second axial groove are disposed complementary to the associated first guide elements and the second guide element to define a lock and key interaction between the filter housing and the ring filter element.

2. The filter appliance according to claim 1, wherein the first axial grooves has at least one of a different shape and a different size with respect to the second axial groove.

3. The filter appliance according to claim 1, wherein the ring filter element is mountable into the filter housing via a mounting movement including guiding at least one of the first guide element and the second guide element on the guide contour.

4. The filter appliance according to claim 3, wherein the first axial groove and the second axial grove of the guide contour each include an inlet cross-section receiving the associated first guide element and the second guide element, and wherein the inlet cross-section of at least one of the first axial groove and the second axial groove increases in a direction along the mounting movement.

5. The filter appliance according to claim 1, wherein the guide contour defines a circular ramp.

6. The filter appliance according to claim 1, wherein the guide contour includes at least two ramps extending in opposite directions with respect to one another.

7. The filter appliance according to claim 4, wherein the inlet cross-section of the first axial groove has a different extent than the inlet cross-section of the second axial groove, and wherein the one of the first axial groove and the second axial groove with the greatest inlet cross-section is arranged along a height of the guide contour at a lower position with respect to the first axial end disc than the other of the first axial grooves and the second axial groove.

8. The filter appliance according to claim 1, wherein:
the guide contour is arranged on a dome of the filter housing engaging into an interior of the ring filter element, and
the first guide elements and the second guide element are arranged on an inner circumference of the ring filter element facing the dome.

9. The filter appliance according to claim 1, wherein:
the guide contour is arranged on an outer circumference of the ring filter element facing the filter housing, and
the first guide elements and the second guide element are arranged on an inner circumference of the filter housing facing the outer circumference of the ring filter element.

10. The filter appliance according to claim 1, characterized in that wherein:
the guide contour is arranged on an inner circumference of the filter housing facing the ring filter element, and
the first guide elements and the second guide element are arranged on an outer circumference of the ring filter element facing the inner circumference of the filter housing.

11. The filter appliance according to claim 1, wherein the guide contour is arranged on a dome of the filter housing projecting into an interior of the ring filter element, wherein the dome includes an axial face side defining at least one ramp increasing in an axial direction from a first point to a second point.

12. The filter appliance according to claim 11, wherein the first axial groove defines an inlet cross-section having a radial extent different from an inlet cross-section defined by the second axial groove, and wherein one of the first axial groove and the second axial groove having the inlet cross-section with the greatest radial extent is disposed at the first point of the at least one ramp.

13. The filter appliance according to claim 11, wherein the axial face side of the dome defines at least two ramps extending in opposite directions with respect to one another, and wherein each ramp increases in the axial direction from a first point to a second point.

14. The filter appliance according to claim 11, wherein the first guide element and the second guide element are arranged on an inner circumference of the ring filter element facing the dome.

15. The filter appliance according to claim 2, wherein the guide contour defines a circular ramp.

16. The filter appliance according to claim 15, wherein the guide contour is arranged on a dome of the filter housing engaging into an interior of the ring filter element; and
wherein the first guide element and the second guide element are arranged on an inner circumference of the ring filter element facing the dome.

17. The filter appliance according to claim 15, wherein the guide contour is arranged on an outer circumference of the ring filter element facing the filter housing; and
wherein the first guide element and the second guide element are arranged on an inner circumference of the filter housing facing the outer circumference of the ring filter element.

18. The filter appliance according to claim 15, wherein the guide contour is arranged on an inner circumference of the filter housing facing the ring filter element; and
wherein the first guide element and the second guide element are arranged on an outer circumference of the ring filter element facing the inner circumference of the filter housing.

19. The filter appliance according to claim 3, wherein the guide contour includes at least two ramps extending in opposite directions with respect to one another.

20. A filter appliance, comprising:
a filter housing and a ring filter element having an axis and being mountable in the filter housing, wherein the ring filter element includes a first axial end disc having an axially protruding pin configured to engage into a channel of the filter housing when the ring filter element is mounted in the filter housing;
the filter housing defining an interior including a first region, and the ring filter element including a second region associated with the first region;
a guide contour arranged on one of the first region of the filter housing and the second region of the ring filter element, wherein the guide contour includes at least a first axial groove and a second axial groove, the first axial groove including at least one of a different shape and a different size with respect to the second axial groove; and
a first guide element associated with the first axial groove and a second guide element associated with the second axial groove, the first guide element and the second guide element disposed on the other of the first region of the filter housing and the second region of the ring filter element, wherein at least the first guide element is configured to guide along the guide contour during the mounting of the ring filter element in the filter housing;
wherein the axially protruding pin engages into the channel and at least the first guide element engages into the first axial groove of the guide contour when the ring filter element is mounted in the filter housing, and wherein the first axial groove and the second axial groove are disposed complementary to the associated first guide element and the second guide element, respectively, to define a lock and key relationship between the filter housing and the ring filter element.

* * * * *